June 1, 1937.  R. D. McDILL  2,082,252
APPARATUS FOR DETERMINING CHARACTERISTICS OF FLUIDS
Filed Sept. 5, 1933  2 Sheets-Sheet 1

INVENTOR.
Rex D. McDill
BY
Hawgood & Van Horn
ATTORNEYS

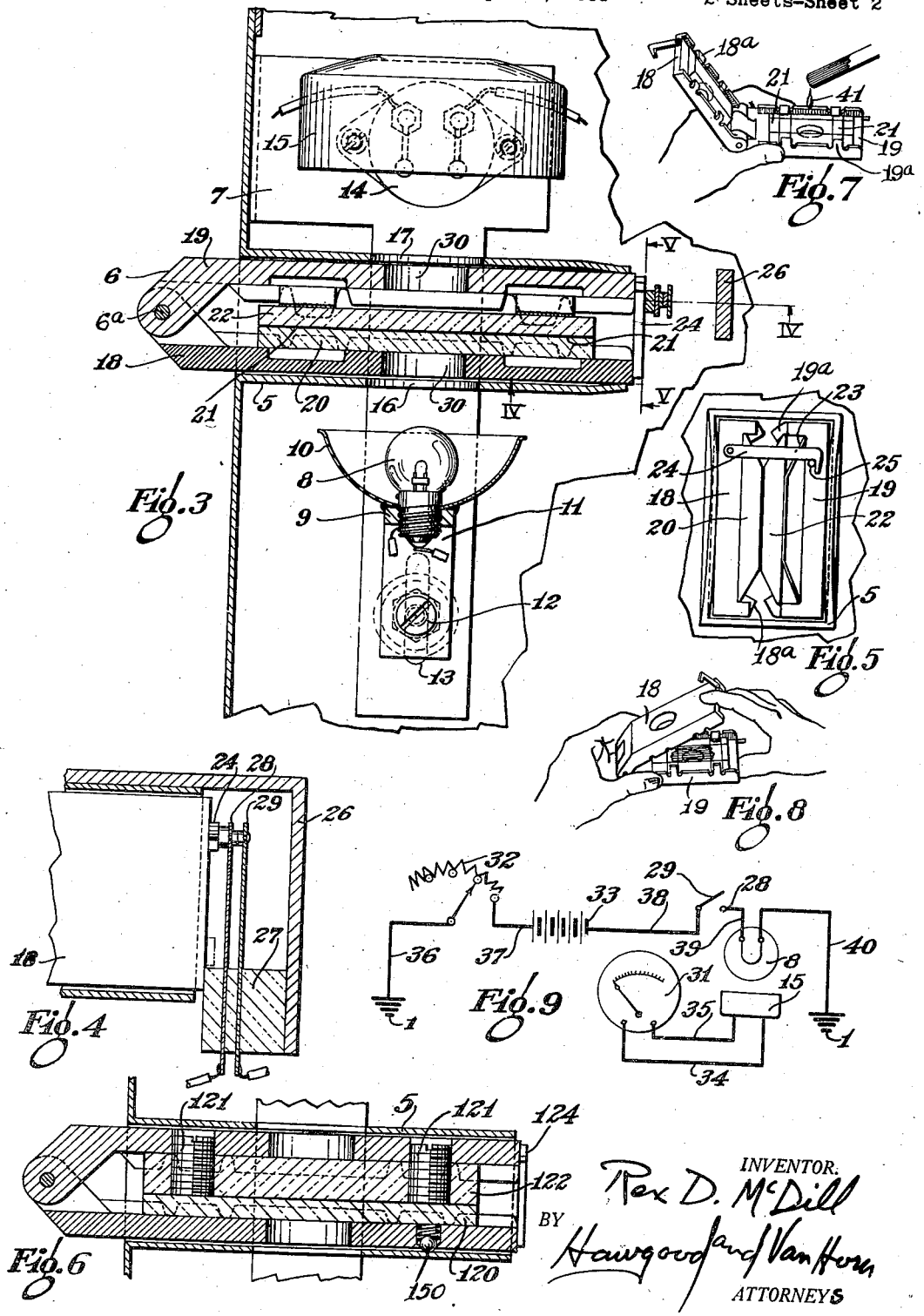

Patented June 1, 1937

2,082,252

UNITED STATES PATENT OFFICE 2,082,252

APPARATUS FOR DETERMINING CHARACTERISTICS OF FLUIDS

Rex D. McDill, East Cleveland, Ohio

Application September 5, 1933, Serial No. 688,090

8 Claims. (Cl. 88—14)

This invention relates to the determination of the transparency or opaqueness of materials and is particularly adapted to the determination of such characteristics of liquid or fluid materials.

An object of the invention is to provide an improved apparatus by which the relative opaqueness or transparency of materials may be accurately measured or compared.

Another object is to provide an improved apparatus by which the opaqueness or transparency of materials may be measured or compared which will be simple in construction and operation.

Another object is to provide an improved apparatus by which the opaqueness or transparency of materials may be measured or compared which will be compact in size and light in weight.

Another object is to provide an improved apparatus which will be automatically controlled.

Other objects will hereinafter appear.

The invention will be better understood from the description of two practical embodiments thereof, illustrated in the accompanying drawings, in which Figure 1 is a plan view of a device designed and calibrated for the comparing of lubricating oils, intended for use by service stations and the like, to indicate the condition of the oil in the engines of automotive vehicles and to determine whether or not it needs to be changed;

Figure 3 is a fragmentary and large sectional view taken on the line III—III of Figure 2;

Figure 4 is a fragmentary view taken on the line IV—IV of Figure 3;

Figure 5 is a view taken on the line V—V of Figure 3;

Figure 6 is a view corresponding to a portion of Figure 3 but showing a modified structure;

Figures 7 and 8 are perspective views showing different stages in the preparation of the parts of the apparatus; and Figure 9 is a diagrammatic view of the electrical circuits used.

Figure 1:
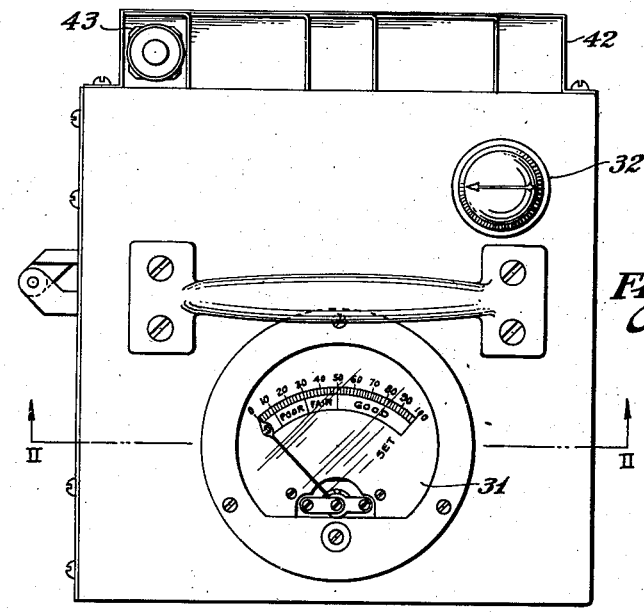
Figure 2:
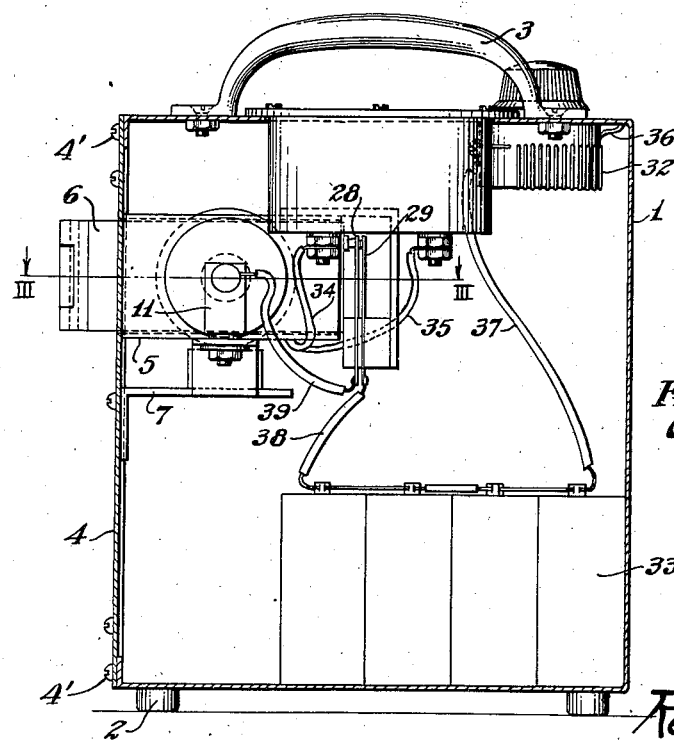
Figure 2 is a sectional view taken on line II—II of Figure 1.

It is well known that lubricating oil when used in crank cases of internal combustion motors and similar situations is subject to deterioration from several causes. An important cause of this deterioration is the acquiring of particles of solid material, such as carbon, together with particles of metal worn from the moving parts of the engine, probably rust, and the like, which particles are generally abrasive in character and of course detrimental to the moving parts of the machinery. The accumulation of such solid material goes on constantly while the machinery is in operation and tends to darken the color of the lubricant very materially. The appearance of the lubricant, however, does not provide any satisfactory criterion of whether the amount of solid material is seriously detrimental to the machinery or not.

By the use of the apparatus above referred to, a small quantity of the lubricant is spread out into a thin film and a beam of light passed through this film. The light is, of course, stopped by the solid particles in its path so that the proportion of light which passes through the film is reversely proportionate to the amount of solid material in suspension.

Accordingly, to determine the relative amount of solid material in suspension, it is necessary first that the thickness of the film studied should be accurately determined; second, that this film be sufficiently thin to permit the passage of a conveniently measurable quantity of light and to prevent the natural coloration of the lubricant itself from having any appreciable effect upon this light; and third, that convenient means be provided for comparing this film with some film of known characteristics which acts as a standard of comparison.

For such a standard, I find it convenient and efficient to use clean, relatively clear oil of a viscosity nearly that of the oil with which it is intended the motor shall be supplied, but it will be apparent that any material could be used as a standard, providing the instrument is properly calibrated with respect to it.

The apparatus consists essentially of two transparent plates between which the fluid to be inspected may be placed and which may be positioned at a small, predetermined distance apart, of a source of light which may be positioned on one side of the film held between the plates, and of a light sensitive recording means positioned on the other side of this film to receive and record the quantity of light passing through the film. In addition, for convenience in calibration, means should be provided for adjusting either the intensity of the light or the light sensitive means so that a base reading can be obtained when the standard film is applied.

The apparatus illustrated consists of a generally rectangular casing 1 which rests upon resilient feet 2, such as rubber buttons, and is provided on its top with a carrying handle 3. One side of the casing 4 is removably connected as by the screws 4' to the remainder, to provide ready access to the parts within.

Secured to this removable side is a rectangular tubular support 5 adapted to receive a slide 6 carrying the material to be inspected. Below and extending to both sides of the support, is a bracket 7 also secured to the removable side and arranged to carry the source of light and the light sensitive element.

The former is shown as an incandescent bulb 8, mounted in a socket 9, carried by a reflector 10, these parts being supported upon an L-shaped bracket 11, and secured by a bolt 12 to the bracket 7. The bolt passes through an elongated slot 13 to permit adjustment of the light toward and from the support 5.

Mounted upon the support 7 on the side of the support 5 remote from the bulb 8 is a socket 14, shown as having two pairs of prong-receiving apertures, connected in parallel, into either pair of which two prongs of a light sensitive element or photo-cell 15 may be inserted, so that the cell may be adjusted into either of two positions with respect to support 5. Two apertures 16 and 17 are provided through the side walls of support 5 in alignment with the bulb and photo-cell.

The slide 6 consists of two arms 18 and 19 hingedly connected together by a pin 6a and arranged to be swung into parallelism for insertion in the device or to be separated as illustrated in Figure 7 for cleaning and for application of the material to be inspected. These arms are shown as of slightly hollowed out or channeled shape, with the recesses facing each other.

In the recess of arm 18 a sheet or pane of glass 20 is situated and held in position by lugs 18a bent inwardly from the flanges of the arm. The edges of the glass are shown as bevelled to provide room for these lugs. Upon the surface of this sheet of glass are secured two thin glass spacer plates 21, the thickness of which I find may conveniently be about six thousandths of an inch, and which may be secured to the plates by sodium silicate or any other desired adhesive. The spacers are shown as two parallel strips of glass secured near the ends of the pane 22 so that any liquid which is placed between them may freely flow to either side and is not confined excepting by the panes 20 and 22. The spacers are themselves disposed within the space defined by the inner surfaces of the panes and hence are of a minimum thickness to maintain these panes at a predetermined distance, thus reducing to a minimum the expansive effects of temperature changes.

A sheet or pane of glass 22 is loosely carried by arm 19, its motion toward arm 18 being limited by lugs 19a similar to those previously described. Between the web of arm 19 and pane 22 resilient means are interposed urging the pane toward arm 18, these resilient means being shown as leaf springs 23, although other types of springs or resilient materials such as rubber may be used.

A hook 24 is pivoted to arm 18 and arranged to engage over pin 25 upon arm 19 to hold the arms in closed position. To assist the hook or to serve as a substitute for it, the inner ends of support 5 are formed to converge and resiliently press upon the ends of the arms when inserted into the device.

An L-shaped bracket 26 is secured to support 5 and carries a block 27 of electrical insulating material which serves as a support for switch arms 28 and 29 and also as a stop limiting the inward motion of the slide 6, as most clearly shown in Figures 3 and 4. The switch arms are positioned to one side of the center of the slide and arranged to be engaged by the hook 24 so that the arms will be pressed together by the slide only when inserted in one position, shown as with a hinged end out and with the hook up.

Holes 30 are provided through arms 18 and 19 in alignment with the portion of the panes between the spacers 21, the holes being smaller than the holes 16 and 17 and so controlling the size of the beam passed through the slide. These holes are positioned nearer one end of the slide than the other so that if the slide should be inserted with the hinged end first, even if the switch 28 and 29 should in some manner be actuated, the beam of light will not pass directly from lamp 8 to the photocell 15, thus serving as a second safeguard against inaccurate positioning of the slide and consequently against the obtaining of inaccurate readings.

Carried by the top of the box is a meter 31 and a rheostat 32 and within the box are positioned dry cells or other sources of electricity 33.

The parts are connected as shown in Figure 9. Wires 34 and 35 extend from the terminals of socket 14 to the terminals of the meter 31, connecting the photocell and meter in one simple circuit.

One side of rheostat 32 is connected at 36 to the casing, serving to ground this side. From the other side of the rheostat a conductor 37 extends to the batteries 33, which, of course, may be connected in any desired fashion, either in series, parallel, or series-parallel, and from the other side of the batteries a conductor 38 extends to the switch arm 29. A conductor 39 passes from switch arm 28 to the socket 9 and the other side of this socket is grounded to the casing as indicated at 40. It will thus be seen the current is caused to pass through the bulb 8 only when the arms 28 and 29 are in contact, in which position they are held by the slide. The intensity of the light emitted by the bulb can be conveniently controlled by adjusting the rheostat 32.

The operation of the device is as follows:

The operator first cleans the surface of panes 20 and 22 and places upon one of them a drop of clear oil 41, as is indicated in Figure 7. He then closes the plates as shown in Figure 8 and so squeezes the drop of oil out to form a film between the panes and overlying the holes 30. The thickness of this film is of course determined by the spacers 21. He next inserts the slide in support 5 until it engages the stop 27. At this point the hook 24 has engaged switch arm 28 and pressed it against arm 29 causing the current to flow through the lamp 8 and illuminate the same. He next observes the position of the hand of meter 31 and then adjusts rheostat 32 until this hand points to the one hundred percent mark of the meter.

He then removes the slide, wipes off the oil and replaces it with a drop of the oil which it is desired to inspect. He again closes the slide, latches the hook and places the slide in the support 5. The used oil will, of course, permit the passage of less light than would the clean oil and the meter hand will now swing to some mark less than one hundred per cent, indicating the transparency of the used oil as a percentage of that of the clear oil.

It is only necessary to bear in mind what percentages indicate oil that is still usable and what indicate oil that should be replaced. However, it is probably more convenient to mark upon the face of the dial the percentages which indicate a proper condition and those which indicate the necessity for change, such as is illustrated in the drawings by the spaces marked with the words "good", "fair" and "poor."

Secured upon the exterior of the casing is an open topped box-like support 42 which may be conveniently divided into compartments for the reception of slides and for jars or bottles 43 containing the clear oil used as a standard.

In Figure 6 a slide is shown in which set screws 121 have been substituted for the glass spacers 21, these set screws being threaded into pane 122 and bearing upon the stationary pane 120, so that the thickness of the film is determined by the amount of extension of the set screws and adjustment is provided for. No hook is provided in this form of slide but a projecting lug 124 performs its function in operating the switch, the arms of the slide being held together solely by the hands of the operator until insertion in the support 5 and thereafter by the ends of this support. A ball latch 150 may be provided to hold the slide in position within the support.

The thickness of the film is determined solely, in the first form by the thickness of the spacer plates 21, and in the second by the extending portions of the spacer set screws 121, the panes being resiliently pressed toward each other, so that any variations of temperature or other causes of expansion in the arms or other parts of the slide will not affect the thickness of the film, and such variations as may take place are due to the expansion of the spacers alone and hence are insignificant.

While the initial setting of the device has been described as obtained with a film of standard fluid, it will be apparent that any fluid or solid transparent standards might be used. For instance, a film or sheet of glass, celluloid, paper or the like which might be colored or rendered partly opaque may be supplied as a standard.

While I have described the above illustrated embodiments of my invention in some particularity, it will be obvious that many modifications and variations therein may be made and that the principles embodied are applicable to many fluids other than the oil above referred to. The field referred to, however, is one in which the invention finds considerable utility and which, it is believed, serves well as an example to clearly indicate how this invention may be used in many other situations. I do not therefore limit myself to the precise details shown and described, but claim as my invention all embodiments, modifications and improvements coming within the scope of the appended claims.

I claim:

1. A slide for inspecting materials which comprises two transparent panes, spacers interposed between the panes to maintain them a predetermined distance apart, a carrier for said panes consisting of two hinged arms each defining a recess and each carrying one pane, latch means for retaining the arms in closed position, the arms being of generally channel- shaped cross section, the panes being positioned within the recesses of the arms.

2. In combination with an incandescent light source and a light sensitive element, a guide interposed between said source and element, and adapted to receive a carrier, said guide having a pair of aligned apertures, a carrier inserted in said guide having two arms hinged together at one end, panes of transparent material supported by said arms, apertures through said arms in alignment with each other and with the apertures in the guide, the apertures being nearer one end of the arms than the other and so adapted to register with the apertures in the guide when the carrier is inserted in one position only.

3. In combination with an incandescent light source and a light sensitive element, a guide interposed between said source and element and adapted to receive a carrier, said guide having a pair of aligned apertures, a carrier inserted in said guide having two arms hinged together at one end, panes of transparent material supported by said arms, apertures through said arms in alignment with each other and with the apertures in the guide, the apertures being nearer one end of the arms than the other and so adapted to register with the apertures in the guide when the carrier is inserted in one position only, and means on said guide pressing said arms together.

4. In combination with an incandescent light source and a light sensitive element, a guide interposed between said source and element, and adapted to receive a carrier, said guide having a pair of aligned apertures, a carrier inserted in said guide having two arms hinged together at one end, panes of transparent material supported by said arms, apertures through said arms in alignment with each other and with the apertures in the guide, the apertures being nearer one end of the arms than the other and so adapted to register with the apertures in the guide when the carrier is inserted in one position only, a stop limiting the motion of said carrier into said guide, a projection on one of said arms, and a switch adapted to be operated by said projection and controlling said source of light.

5. A slide for inspecting materials which comprises two transparent panes, spacers interposed to maintain the panes at a predetermined distance, a carrier for said panes consisting of two hinged arms each carrying one pane, the arms being of generally channel-shaped cross section defining recesses and the panes being positioned within the recesses of the arms.

6. A slide for inspecting materials which comprises two relatively movable transparent panes having plane adjacent surfaces, a carrier for said panes consisting of two hinged arms each carrying one pane, a plurality of plane surfaced spacers interposed between said panes, the spacers being separated to permit free flow of liquid between the panes and between and beyond the spacers.

7. A slide for inspecting materials which comprises two relatively movable transparent panes having plane adjacent surfaces, a carrier for said panes consisting of two hinged arms each carrying one pane, a plurality of plane surfaced spacers interposed between said panes, the spacers being separated to permit free flow of liquid between the panes and between and beyond the spacers, and resilient means pressing the panes toward each other and against the spacers.

8. A slide for inspecting materials which comprises two relatively movable transparent panes having plane adjacent surfaces, a carrier for said panes consisting of two hinged arms each carrying one pane, a plurality of plane surfaced spacers interposed between said panes, the spacers being separated to permit free flow of liquid between the panes and between and beyond the spacers, said carrier constituting a protection for said panes and comprising relatively movable arms and resilient means pressing the panes toward each other and against the spacers.

REX D. McDILL.